US008194627B1

United States Patent
Zhang

(10) Patent No.: US 8,194,627 B1
(45) Date of Patent: Jun. 5, 2012

(54) APPARATUS AND METHOD FOR COMMUNICATION WITH A MOBILE COMMUNICATIONS DEVICE IN AN IP NETWORK

(75) Inventor: Qiang Zhang, Fairfax, VA (US)

(73) Assignee: Nextel Communications, Reston, VA (US)

( * ) Notice: Subject to any disclaimer, the term of this patent is extended or adjusted under 35 U.S.C. 154(b) by 1049 days.

(21) Appl. No.: 11/689,139

(22) Filed: Mar. 21, 2007

(51) Int. Cl.
*H04W 4/00* (2009.01)
*H04L 12/28* (2006.01)
*H04L 12/56* (2006.01)

(52) U.S. Cl. .................. 370/338; 370/401; 370/395.52; 455/435.1

(58) Field of Classification Search .................. 370/338, 370/401, 395.52; 455/435.1
See application file for complete search history.

(56) References Cited

U.S. PATENT DOCUMENTS

| 6,487,406 B1* | 11/2002 | Chang et al. ............... 455/422.1 |
| 2002/0067704 A1* | 6/2002 | Ton .............................. 370/329 |
| 2004/0092260 A1* | 5/2004 | Thubert et al. ............. 455/435.1 |
| 2007/0115885 A1* | 5/2007 | Singh et al. .................... 370/331 |

OTHER PUBLICATIONS

Simpson, RFC1853 IP in IP Tunneling Oct. 1995, Network Working Group, RFC1853, 6 pages.*

* cited by examiner

*Primary Examiner* — Nick Corsaro
*Assistant Examiner* — Munsoon Choo

(57) ABSTRACT

A system and method for communication with a mobile communications device in an Internet Protocol (IP) network is disclosed. In an embodiment, the system includes an application server and a mobile communications device. A first foreign agent and a first home agent are coupled to the application server and a second foreign agent and a second home agent are coupled to the mobile communications device. The first foreign agent creates a first binding for the second foreign agent and the second foreign agent creates a second binding for the first foreign agent. The first foreign agent communicates directly with the second foreign agent by utilizing the first binding and the second foreign agent communicates directly with the first foreign agent by utilizing the second binding.

20 Claims, 2 Drawing Sheets

APPARATUS AND METHOD FOR COMMUNICATION WITH A MOBILE COMMUNICATIONS DEVICE IN AN IP NETWORK

FIELD OF THE INVENTION

The present invention relates generally to the field of telecommunications, and in particular to communication with a mobile communications device in an Internet Protocol (IP) network.

BACKGROUND OF THE INVENTION

IP networks were originally designed to communicate packets between a host and a corresponding node. A corresponding node can send data packets to the IP host by setting the destination of these packets to that of the IP host. The IP network discovers the connectivity of the network nodes and routes the data packets using standard topologies and IP protocols such as Open Shortest Path First (OSPF) and Border Gateway Protocol (BGP). With the knowledge of the network and the IP forwarding mechanisms, data packets flow from the corresponding node to the IP host typically along the shortest route in the network. Current IP networks predominantly use a specific IP addressing scheme and routing protocols known as IP version 4 (IPv4).

With the development of data applications such as Voice over IP (VoIP), Short Message Service (SMS), Multi-Media Messaging Service (MMS) in mobile networks it became necessary to extend signaling and routing protocols to enable communication with mobile devices that can attach to the network from anywhere via a local access point. With that objective in mind, Mobile IPv4 (MIPv4) was developed. Mobile IPv4 allows for communication between mobile devices and between mobile devices and application servers connected to the network. These application servers can provide a variety of services to the mobile devices, including Sprint Nextel's Push-To-X services, where X can be, for example, weather, sports, etc., and other various IP Multimedia Subsystem (IMS) services. Additionally, these application servers may be a SIP proxy/gateway or a media gateway (SIP Proxy/GW/MGW) to the network.

FIG. 1 illustrates a conventional network architecture implementing MIPv4. As illustrated in FIG. 1, a SIP Proxy/GW/MGW 100 is coupled to a home agent (HA-1) 120. A mobile communications device 200 communicates with the network through mobile data gateway/foreign agent (MDG/FA) 210 and home agent (HA-2) 220.

As is known, with current MIPv4 communications, when the mobile device 200 communicates with the SIP Proxy/GW/MGW 100, or vice versa, the communication route for data traffic must always pass through a home agent. This architecture can present problems.

Such an architecture does not allow data traffic to flow along the shortest route from the SIP Proxy/GW/MGW to the mobile communications device. This un-optimized route for data traffic causes several deficiencies in communication quality. First, because the route may be unnecessarily long, the end-to-end transmission delay can be significantly longer. Longer delays may cause significant quality degradation in delay-sensitive services such as VoIP and Push-to-Talk over Cellular (PoC). Typically, delay in a mobile network is longer than fixed networks. Thus, additional delay may be particularly detrimental in mobile networks. Second, traffic to all the mobile communications devices registered with a home agent must pass through the home agent, which causes congestion. In addition, a single home agent failure could unnecessarily disrupt all traffic routed through the home agent. Thus, routing performance could be degraded in the network due to the requirement that a home agent is in the forwarding path for networks using conventional MIPv4 routing. Third, more network bandwidth is required to carry traffic in a non-optimal way. A requirement for more network bandwidth leads to a more expensive network.

Therefore, there is a need for an improved system and method for route optimization in an IP network.

SUMMARY OF THE INVENTION

A system and method for communication with a mobile communications device in an Internet Protocol (IP) network is provided. In an embodiment, the system includes an application server and a mobile communications device. A first foreign agent and a first home agent are coupled to the application server and a second foreign agent and a second home agent are coupled to the mobile communications device. The first foreign agent creates a first binding for the second foreign agent and the second foreign agent creates a second binding for the first foreign agent. The first foreign agent communicates directly with the second foreign agent by utilizing the first binding and the second foreign agent communicates directly with the first foreign agent by utilizing the second binding.

DETAILED DESCRIPTION OF THE EXEMPLARY EMBODIMENTS

As will be further described below, in accordance with the principles of the present invention, for a mobile device facing application servers, e.g., SIP proxy/gateway or media gateway, that are a logical application level of next-hops for the mobile handsets, a new Mobile IPv4 foreign agent (FA) is provided to enable route optimized mobile-application communication. Alteration of mobile IP signaling is implemented on the existing mobile data gateway/foreign agent (MDG/FA), as well as on the home agent (HA). Alteration of mobile IP data switching is implemented on the MDG/FA.

Figure 1:
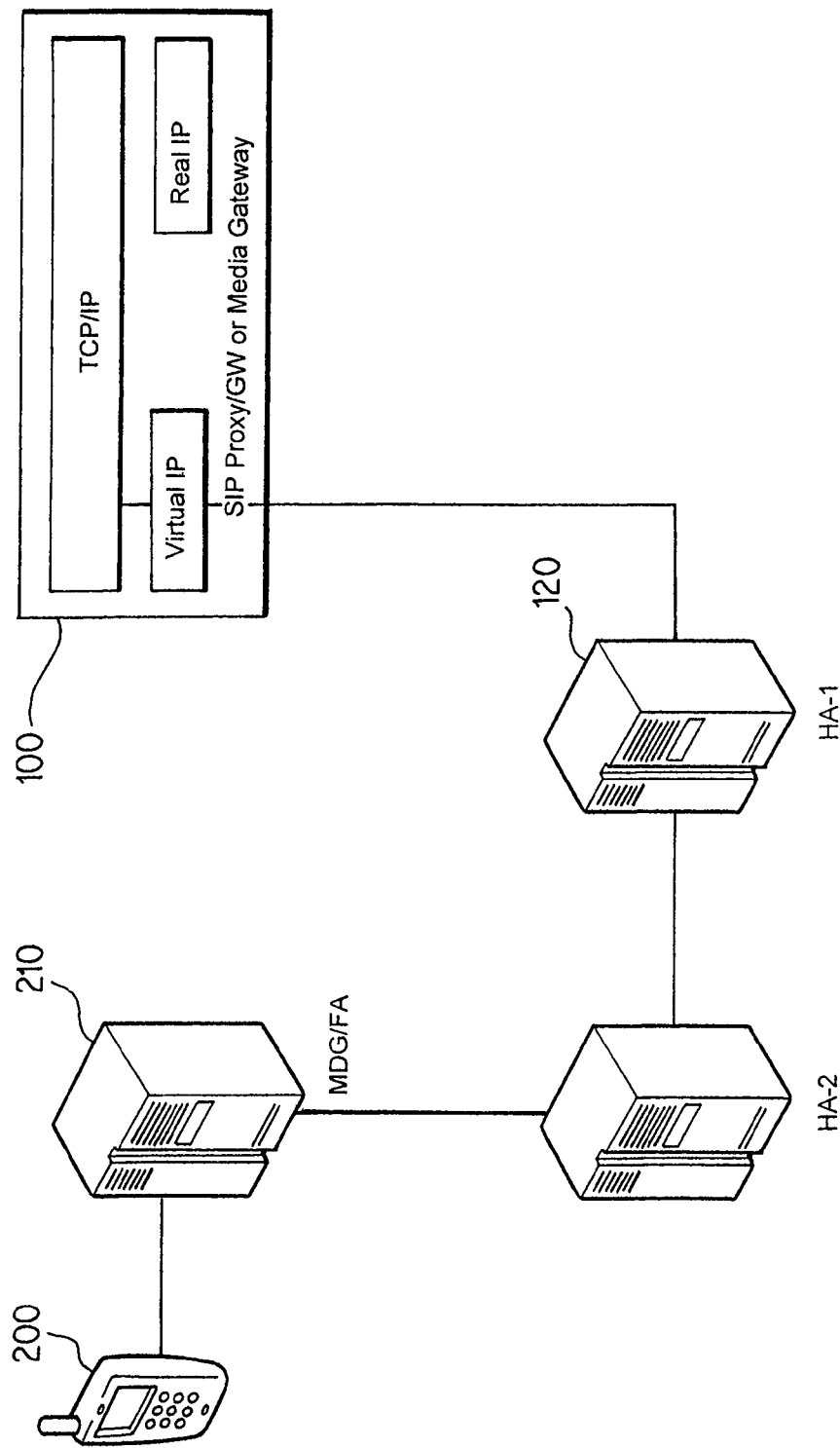
FIG. 1 illustrates a conventional network architecture implementing MIPv4.
Figure 2:
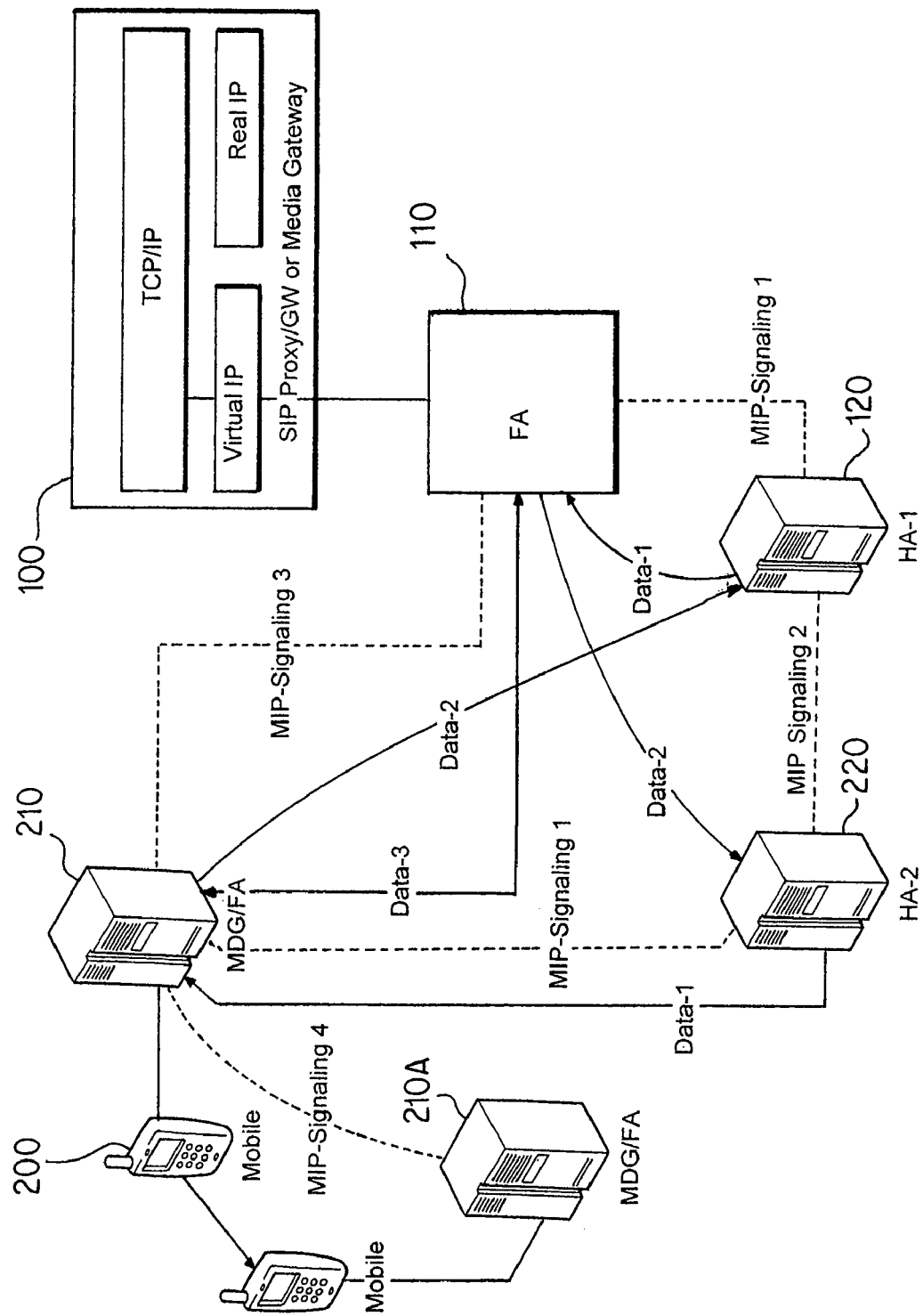
FIG. 2 illustrates an embodiment of an IP network architecture and an information flow in accordance with the principles of the present invention.

In the architecture in accordance with the principles of the present invention illustrated in FIG. 2, application server 100 has a dedicated mobile node (MN) interface toward mobile devices and is registered on home agent HA-1 120. The mobile device 200 is registered on home agent HA-2 220. Additionally in the architecture, the SIP based application proxy or server and media gateway 100 has a private Mobile IPv4 capable network interface 110 when communicating with mobile IP capable mobile devices. This interface 110 can be enabled either by introducing a co-located mode foreign agent gateway module on the application server and media gateway, or utilize a proxy-mobile IP foreign agent gateway. As will be explained further below, the foreign agent gateways and home agents (used by mobile 200 and SIP Proxy/GW/MGW 100) implement an add-on route optimized signaling. Therefore, the architecture can reduce mobile IP packet routing redundancy incurred in today's MIP capable networks between mobiles and SIP Proxy/GW/MGWs.

The basic logic flow in accordance with the principles of the present invention is as follows. A mobile 200 registers on a network and also performs MIP registration to its FA 210 and HA 220. SIP Proxy/GW/MGW 100 will also be registered using its MIP interface to FA 110 and HA 120. When the mobile 200 tries to connect to SIP Proxy/GW/MGW 100 for first time, or vice versa, the destination peer's HA will respond with a binding update on behalf of the destination peer. Therefore a direct binding for the destination can be established on the originator. After the mobile 200 and SIP Proxy/GW/MGW 100 establish bindings for each other, they can have direct communications with each other through the respective FAs. An interface specification for this logic flow is provided below.

MIP Signaling-1/Data-1, as shown in FIG. 2, is as follows for both mobile device 200 and SIP Proxy/GW/MGW 100. On a mobile node MIP registration request (RRQ), the FAs 110 and 210 append a registration extension claiming its capability for the route optimization. HAs 120 and 220, respectively, confirm the capability in a registration extension in a MIP registration reply (RRP) and marks the capability in the binding cache for the mobile or a global setting for the particular FA.

In MIP Signaling-2, a destination HA sends its respective mobile's MIP binding to a source that originated an IP packet. For example, if mobile device 200 originates an IP packet for SIP Proxy/GW/MGW 100, HA 120 sends the SIP Proxy/GW/MGW's MIP binding to HA 220, which is associated with the mobile device 200. Similarly, if SIP Proxy/GW/MGW 100 originates an IP packet for mobile device 200, HA 220 sends the mobile device's MIP binding to HA 120, which is associated with the SIP Proxy/GW/MGW 100. The reason that the source packet can reach the destination's HA is because the source doesn't yet have a direct MIP binding toward the destination. Therefore, the packet will come to the destination's HA.

MIP Signaling-3 is the binding update procedure between the mobile device 200 and SIP Proxy/GW/MGW 100 when the binding cache for each other is about to expire on the respective FAs. The operation is carried out by the FAs 110 and 210 on behalf of the mobile and SIP Proxy/GW/MGW. The binding update will resend the other end the source's mobile IP and its care-of-address (COA).

In MIP Signaling-4, when mobile device 200 moves from one FA to another, e.g., from FA 210 to FA 210A, the previous FA, e.g., FA 210, transfers the route caches established for this mobile earlier to the new FA, e.g., FA 210A.

In further describing the principles of the present invention, as further illustrated in FIG. 2, Data-2 refers to the data sessions when mobile device (source) 200 attaches to a new FA and for the first time transmits an IP packet from the FA to the SIP Proxy/GW/MGW (destination) 100, as well as when SIP Proxy/GW/MGW (source) 100 for the first time sends an IP packet to the mobile (destination) 200. In both circumstances, the source FA (sFA) sends the packet to the destination's HA (dHA), the dHA then sends the packet in the HA-FA MIP tunnel to the destination's FA (dFA). At the same time the dHA looks up the dFA's capability. If the dFA supports route optimization, the dHA will send a binding notification (MIP Signaling-2) to the source's IP address, which is either the mobile 200 or the SIP Proxy/GW/MGW 100 depending on who the source is. The binding notification (BN) contains the dFA's IP address and capability as well as the destination's IP address and information. The BN traverses the source's HA (sHA) and arrives at the source's FA (sFA). The sFA inserts the binding for the destination in the binding cache. After the first packet exchange between the source and destination mobile nodes, source and destination bindings will be created in dFA's and sFA's binding cache. Thereafter, the source and destination can directly communicate with each other through Data-3. The binding caches can be renewed at a configured interval between the sFA and dFA to each other using MIP Signaling-3.

Therefore, as discussed above, Data-3 is peer to peer Mobile IP tunneling, using either a User Datagram Protocol (UDP) tunnel or an IP-IP tunnel. The inner IP header contains the virtual fixed mobile IP address and the external IP header contains the care-of-address (sFA and dFA addresses or their delegation IP addresses).

As was also discussed above, MIP Signaling-4 is associated with a mobile that moves into a new FA region and performs handover. The IP level handover will occur after radio handover. Once the IP handover occurs, the mobile should signal the new FA (nFA), e.g., FA 210A, the IP address of the old FA (oFA), e.g., FA 210. The nFA should retrieve from the oFA the existing binding cache maintained for the mobile 200 and perform a binding update with the mobile's new location to the mobile's peers in its binding cache.

Thus, through the system and method of the present invention, the inherent packet data latency imposed in the existing system architecture/standard is reduced. The traffic bottle neck and load requirement in the mobile IP home agent system is removed. Additionally, true peer to peer routing and security bindings between mobiles, as well as between application servers/media gateways and mobiles, is provided. The present invention can be used for any Mobile IPv4 based SIP/IMS applications within a carrier network, and for Push to View services, e.g., as provided by service provider Sprint Nextel, the invention will introduce lower IP latency and reduce the load on the mobile IP home agent system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A system for communication with a mobile communications device in an Internet Protocol (IP) network, comprising:
   an application server;
   a first foreign agent and a first home agent, wherein the application server is registered to the first foreign agent and the first home agent;
   a mobile communications device; and
   a second foreign agent and a second home agent, wherein the mobile communications device is registered to the second foreign agent and the second home agent;
   wherein the first foreign agent receives a binding notification from the second home agent through a first communication path and creates a first binding for the second foreign agent;
   wherein the second foreign agent receives a binding notification from the first home agent through a second communication path and creates a second binding for the first foreign agent;
   and wherein the first foreign agent communicates through a third communication path directly with the second foreign agent by utilizing the first binding and wherein the second foreign agent communicates directly with the first foreign agent through the third communication path by utilizing the second binding, wherein the third communication path does not include the first home agent and the second home agent.

2. The system of claim 1, wherein the first foreign agent communicates directly with the second foreign agent by utilizing a mobile IP tunnel and wherein the second foreign agent communicates directly with the first foreign agent by utilizing the mobile IP tunnel.

3. The system of claim 2, wherein the mobile IP tunnel is a User Datagram Protocol (UDP) tunnel.

4. The system of claim 2, wherein the mobile IP tunnel is an IP-IP tunnel.

5. The system of claim 1, wherein the first and second bindings include an IP address.

6. The system of claim 1, wherein the first and second bindings are created in a binding cache in the respective first and second foreign agents.

7. The system of claim 1, wherein the first home agent sends a first binding update for the first foreign agent to the second home agent, and wherein the second home agent sends a second binding update for the second foreign agent to the first home agent.

8. The system of claim 7, wherein the first foreign agent creates the first binding for the second foreign agent by utilizing the second binding update, and wherein the second foreign agent creates the second binding for the first foreign agent by utilizing the first binding update.

9. The system of claim 1:
wherein the first foreign agent appends a first registration extension to a first registration request sent to the first home agent;
wherein the second foreign agent appends a second registration extension to a second registration request sent to the second home agent; and
wherein the first and second registration extensions relate to a capability of the respective first and second foreign agents for route optimization.

10. The system of claim 9:
wherein the first home agent confirms the first registration extension in a first registration reply sent to the first foreign agent; and
wherein the second home agent confirms the second registration extension in a second registration reply sent to the second foreign agent.

11. A method for communication with a mobile communications device in an Internet Protocol (IP) network, wherein the network includes:
an application server;
a first foreign agent and a first home agent, wherein the application server is registered to the first foreign agent and the first home agent; and
a second foreign agent and a second home agent, wherein the mobile communications device is registered to the second foreign agent and the second home agent;
comprising the steps of:
creating a first binding by the first foreign agent for the second foreign agent based on a binding notification received from the second home agent received through a first communication path;
creating a second binding by the second foreign agent for the first foreign agent based on a binding notification from the first home agent received through a second communication path and;
communicating directly with the second foreign agent by the first foreign agent through a third communication path by utilizing the first binding; and
communicating directly with the first foreign agent by the second foreign agent through the third communication path by utilizing the second binding,
wherein the third communication path does not include the first home agent and the second home agent.

12. The method of claim 11, further comprising the steps of communicating directly with the second foreign agent by the first foreign agent by utilizing a mobile IP tunnel and directly communicating with the first foreign agent by the second foreign agent by utilizing the mobile IP tunnel.

13. The method of claim 12, wherein the mobile IP tunnel is a User Datagram Protocol (UDP) tunnel.

14. The method of claim 12, wherein the mobile IP tunnel is an IP-IP tunnel.

15. The method of claim 11, wherein the first and second bindings include an IP address.

16. The method of claim 11, wherein the first and second bindings are created in a binding cache in the respective first and second foreign agents.

17. The method of claim 11, further comprising the steps of sending a first binding update for the first foreign agent to the second home agent by the first home agent and sending a second binding update for the second foreign agent to the first home agent by the second home agent.

18. The method of claim 17, wherein the first foreign agent creates the first binding for the second foreign agent by utilizing the second binding update and wherein the second foreign agent creates the second binding for the first foreign agent by utilizing the first binding update.

19. The method of claim 11, further comprising the steps of:
appending a first registration extension to a first registration request sent to the first home agent by the first foreign agent; and
appending a second registration extension to a second registration request sent to the second home agent by the second foreign agent;
wherein the first and second registration extensions relate to a capability of the respective first and second foreign agents for route optimization.

20. The method of claim 19, further comprising the steps of:
confirming the first registration extension in a first registration reply sent to the first foreign agent by the first home agent; and
confirming the second registration extension in a second registration reply sent to the second foreign agent by the second home agent.

* * * * *